No. 695,236. Patented Mar. 11, 1902.
J. A. ROY.
ALARM DEVICE.
(Application filed Dec. 2, 1901.)
(No Model.)

Witnesses
C. H. Raeder
T. E. Turpin

Inventor
Joseph A. Roy
By James Shuhy
Attorney

UNITED STATES PATENT OFFICE.

JOSEPH A. ROY, OF DUDLEY, MASSACHUSETTS.

ALARM DEVICE.

SPECIFICATION forming part of Letters Patent No. 695,236, dated March 11, 1902.

Application filed December 2, 1901. Serial No. 84,333. (No model.)

*To all whom it may concern:*

Be it known that I, JOSEPH A. ROY, a citizen of the United States, residing at Dudley, in the county of Worcester and State of Massachusetts, have invented new and useful Improvements in Alarm Devices, of which the following is a specification.

My invention relates to automatic alarms for apprising housewives or servants when refrigerator-pans or the like are full and require emptying; and it has for its general object to provide such a device which is a material simplification of those extant, is readily attachable to and detachable from an ordinary refrigerator-pan, and is reliable in operation.

With the foregoing in mind the invention will be fully understood from the following description and claims when taken in conjunction with the accompanying drawings, in which—

Figure 1:
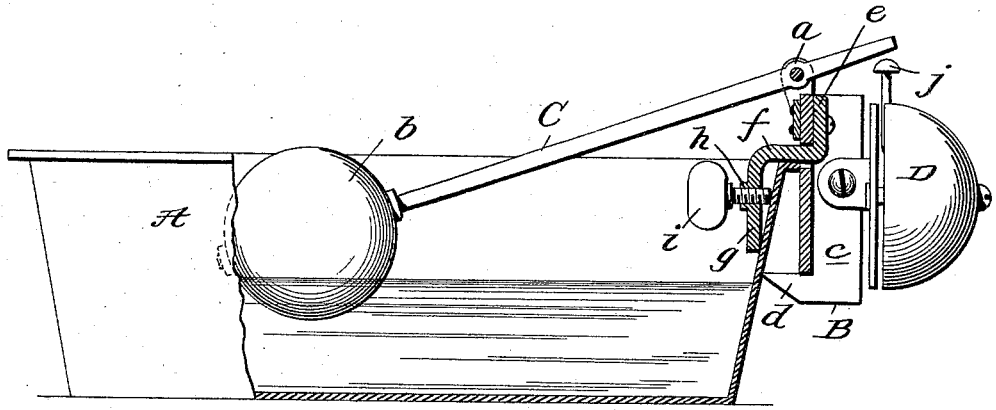
Figure 2:
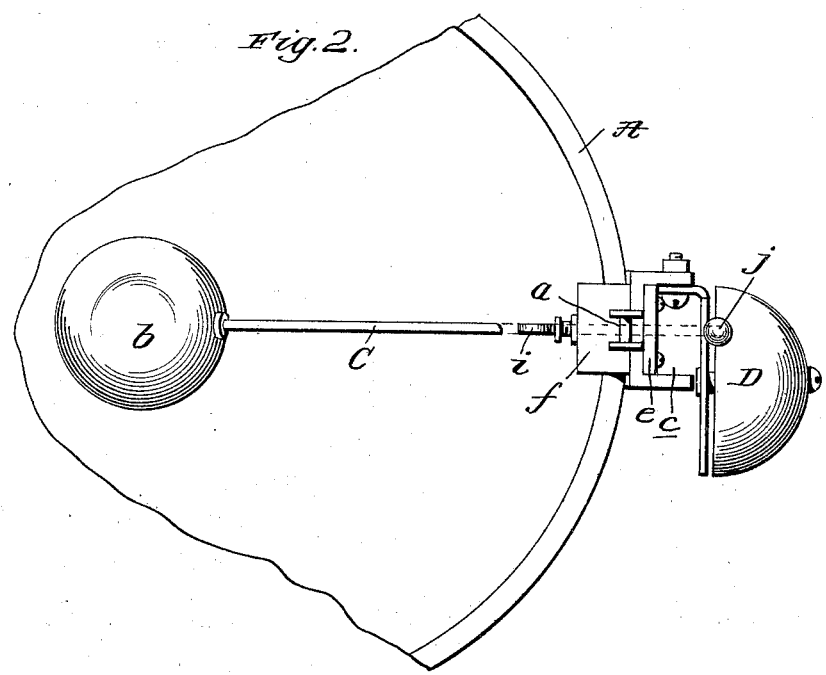

Figure 1 is a view, partly in elevation and partly in section, of a refrigerator-pan equipped with my improved alarm device; and Fig. 2, a detail plan thereof.

Similar letters of reference designate corresponding parts in both views, referring to which—

A is a pan such as ordinarily placed under a refrigerator to receive the water that drips therefrom; B, a clamp which constitutes the body or supporting-frame of my improved device; C, a lever fulcrumed at $a$ on the clamp and having its inner arm disposed in the pan and equipped with a hollow ball or other suitable float $b$, and D a bell carried by the clamp.

The clamp B in the preferred embodiment of the invention comprises an outer member $c$, having an inwardly-directed point $d$ at its lower end, arranged to engage the pan and assist in securing the clamp in a vertical position on the pan, an inner member $e$, fixedly connected to the outer member and having a horizonal portion $f$, arranged to bear on the upper edge of the pan, and also having a depending arm $g$, provided with a transverse aperture $h$, and a thumb-screw $i$, which bears in the said aperture $h$ and is arranged to engage the inner side of the side wall of the pan. Said clamp is obviously adapted to be quickly and easily secured in an upright position on the side wall of the pan after the manner shown, and while not liable to casually become loose may with equal facility be removed from the pan when desired.

The bell D is by preference the type of bicycle-bell in which a wound-up spring connected with the hammer or hammers is released by the inward or downward movement of a plunger $j$ and caused to throw the hammer or hammers against the gong. Said plunger $j$ is disposed below the outer arm of the lever C, and hence it follows that when the lever is rocked, as hereinafter described, the bell will be caused to ring.

In practice my improved alarm is secured on the pan A, as shown, and the pan is placed under the drip-pipe of a refrigerator after the usual manner. With this done, when the water approaches the upper edge of the pan it will raise the float-arm of the lever C and depress the outer arm thereof and through the medium of said outer arm will also depress the plunger $j$, ring the bell D, and apprise a servant or other attendant of the fact that the pan requires emptying.

It will be readily appreciated from the foregoing that notwithstanding its simplicity and adaptability to be quickly and easily secured on an ordinary refrigerator-pan without the employment of skilled labor my improved alarm device is very reliable in operation; also, that the device embodies no parts that are liable to get out of order after a short period of use and requires no attention other than the occasional winding up of the bell.

Having described my invention, what I claim, and desire to secure by Letters Patent, is—

1. In an alarm device for a refrigerator-pan or other vessel, the combination of a clamp comprising an outer member having an inwardly-directed point at its lower end, an inner member fixedly connected to the outer member and having a horizontal portion arranged to bear on the upper edge of a pan, and an arm depending from said portion and provided with a threaded aperture, and a screw bearing in said aperture and arranged to engage the wall of the pan, a bell carried by the clamp, and a float-bearing lever fulcrumed on the clamp and arranged when rocked to ring the bell.

2. In an alarm device for a refrigerator-pan or other vessel, the combination of a clamp comprising an outer member having an inwardly-directed point at its lower end, an inner member fixedly connected to the outer member and having a horizontal portion arranged to bear on the upper edge of a pan, and an arm depending from said portion and provided with a threaded aperture, and a screw bearing in said aperture, a bell carried by the clamp and having a plunger the depression of which causes it to ring, and a lever fulcrumed at an intermediate point of its length on the clamp and having a float on its inner arm, and its outer arm disposed over and adapted to engage the plunger of the bell.

In testimony whereof I have hereunto set my hand in presence of two subscribing witnesses.

JOSEPH A. ROY.

Witnesses:
H. J. CLARKE,
M. F. CLARK.